United States Patent [19]
Waldsmith

[11] Patent Number: 5,297,327
[45] Date of Patent: Mar. 29, 1994

[54] CRYOGENIC REMOVAL METHOD FOR EPOXY IMPREGNATED COILS FROM RIGID OUTER HOUSINGS

[75] Inventor: Gary R. Waldsmith, Pilot Hill, Calif.

[73] Assignee: The United States of America as represented by the Secretary of the Air Force, Washington, D.C.

[21] Appl. No.: 83,754

[22] Filed: Jun. 25, 1993

[51] Int. Cl.⁵ .............................................. B23P 19/04
[52] U.S. Cl. .................................. 29/403.3; 29/426.4; 29/426.5; 29/DIG. 96
[58] Field of Search ............. 29/402.03, 402.18, 403.1, 29/403.2, 403.3, 426.1–426.5, 527.4, 605, 606, 564.1, 564.3, 564.5, 762, DIG. 88, DIG. 96; 156/344; 242/7.07; 335/216

[56] References Cited

U.S. PATENT DOCUMENTS

| | | | |
|---|---|---|---|
| 4,016,639 | 4/1977 | Dombrowski et al. | 29/403.3 X |
| 4,030,184 | 6/1977 | Dombrowski et al. | 29/403.3 |
| 4,986,078 | 1/1991 | Laskaris | 335/216 X |
| 5,001,828 | 3/1991 | Missman | 29/426.4 X |
| 5,111,172 | 5/1992 | Laskaris | 335/216 |

FOREIGN PATENT DOCUMENTS

| | | | |
|---|---|---|---|
| 54-7272 | 4/1979 | Japan | 29/403.2 |
| 57-57464 | 4/1982 | Japan | 29/403.3 |

*Primary Examiner*—Peter Dungba Vo
*Attorney, Agent, or Firm*—Donald J. Singer; Irwin P. Garfinkle

[57] ABSTRACT

A defective focusing coil, impregnated with and held in place with epoxy is removed from its inner lead liner and its outer brass housing by immersing the assembled parts in a bath of liquid nitrogen until the temperature of the assembly is reduced to the temperature of the liquid nitrogen, about −350° F. The assembly is then removed from the bath and a series of sharp blows are then directed to the side of the brass housing to break the bond between the super cooled epoxy and the housing. Axial pressure is then applied to the coil, to remove the coil and liner. The coil is then cut longitudinally into two half cylinders, whereupon the coil is split from the liner, all without injury to either the liner or the housings.

8 Claims, 1 Drawing Sheet

CRYOGENIC REMOVAL METHOD FOR EPOXY IMPREGNATED COILS FROM RIGID OUTER HOUSINGS

STATEMENT OF GOVERNMENT INTEREST

The invention described herein may be manufactured and used by or for the Government for governmental purposes without the payment of any royalty thereon.

BACKGROUND OF THE INVENTION

This is a adaptation of my inventions disclosed in U.S. Pat. Nos. 5,070,063, issued Dec. 10, 1991 and 5,199,159, issued Apr. 6, 1993. My prior U.S. Pat. No. 5,070,063 related generally to a method of separating printed circuit wiring boards and, more particularly, to a method of cyrogenically separating multi-layer printed circuit wiring boards without damaging the printed circuit on the individual layers. My prior U.S. Pat. No. 5,199,159 involved the cryogenic removal of the field windings of a generator or motor. This invention involves the method of removing focusing coils from their rigid housings without damaging the housings.

Focusing coils are comprised of an assembly including an inner lead liner, an epoxy encapsulated coil, and an outer brass housing. During manufacture, the epoxy on the coil bonds the coil to both the liner and the housing. If the coil becomes defective, it is desirable to re-use the liner and housing, since these are expensive items to replace. In the past, the outer brass housing with the focusing coil in place, and containing the inner lead liner along with a brass rear flange were placed in a burn out furnace. The furnace was then heated to 500° F. for 20 hours. This was done in a reducing environment (without oxygen). The toxic gases and the ash resulting from this burn out were released into the environment via the foundry chimney. In some cases, the epoxy was not completely ashed, and the apparatus was put through a second heating cycle. The coil was then removed from the outer housing by hand. The personnel were required to wear a respirator, gloves, coveralls, and other protective gear. The whole operation was labor intensive, and in some cases the lead shield melted so that additional precautions had to be taken to protect the personnel. In addition, the venting of the ash and gases up the foundry stack created an environmental hazard.

SUMMARY OF THE INVENTION

A focusing coil, impregnated with and held in place with epoxy is removed from its inner lead liner and its outer brass housing by immersing the assembled parts in a bath of liquid nitrogen until the temperature of the assembly is reduced to the temperature of the liquid nitrogen, that is, until the system is in equilibrium at about −350° F. A series of sharp blows are then directed to the side of the brass housing to break the bond between the super cooled epoxy and the housing. Axial pressure is then applied to the coil, whereupon it is removed without injury to either the coil or the housings.

OBJECTS OF THE INVENTION

It is a primary object of this invention is to separate an epoxy impregnated coil which is mounted on and adhered to a lead liner, which are mounted within and adhered to a brass housing without damaging the liner or the housing.

Still another object of this invention is to separate an epoxy impregnated coil which is mounted on and adhered to a lead liner, which are mounted within and adhered to a brass housing without damaging the liner, the housing or the coil by immersing the components into liquid nitrogen until the parts are at the temperature of the liquid nitrogen.

Another object of this invention is to separate an epoxy impregnated coil which is mounted on and adhered to a lead liner, which are mounted within and adhered to a brass housing without damaging the liner or the housing, by immersing the components into liquid nitrogen until the parts are at the temperature of the liquid nitrogen, and thereafter breaking the epoxy bond by applying a series of sharp blow to the brass housing followed by axial pressure applied to the coil and liner.

These and many objects and advantages of the present invention will be readily apparent to one skilled in the pertinent art from the following detailed description of a preferred embodiment of the invention and the related drawings.

DESCRIPTION OF THE PREFERRED EMBODIMENT

Figure 1:
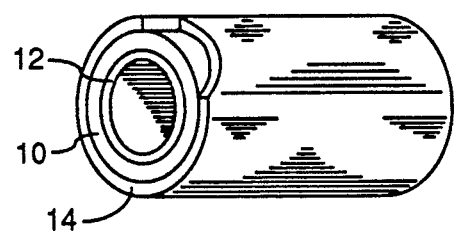
FIG. 1 shows a focusing coil as mounted on a liner and within a housing.

Referring to the drawings, the components to be separated in accordance with the teachings of this invention comprise a focusing coil 10, impregnated with an epoxy, and mounted on a lead liner 12, and within a brass sleeve 14. The coil 10, is bonded to both the liner and the housing by means of the epoxy. While not shown in the drawings, the assembly usually includes a mounting flange, and other components.

In order to separate the focusing coil 10 from both the liner and the housing, the following method was used:

First, all hardware (not shown) is removed from the coil housing 14. In some cases, a mounting flange may be left in place.

Second, the assembly is then put in a bath of liquid nitrogen at a temperature of approximately −350° F.

Third, the assembly remains in the liquid nitrogen bath until cooled to the temperature of the liquid nitrogen (350° F.) The temperature of the assembly is cooled to −350° F., at ehich time it will be observed that boiling in the area of the assembly has stopped, indicating the no heat is leaving the assembly.

Fourth, the assembly is removed from the liquid nitrogen bath. In some instances, the assembly includes a rear flange (not illustrated) which is detached next.

Fifth, the outer housing is struck with a rubber mallet to break the epoxy/outer housing bond.

Sixth, the coil 10, along with the lead liner 12 is then slid out of the housing. If necessary, the coil is removed with a conventional hydraulic press. This was done by shaping a wooden block to the dimensions of the coil and to fit within the housing 14. With the block in place, the coil and the inner liner are easily pushed out of the housing by means of the press.

Figure 2:
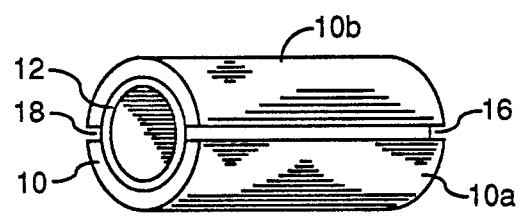
FIG. 2 shows the components in a partial state of disassembly.
Figure 3:
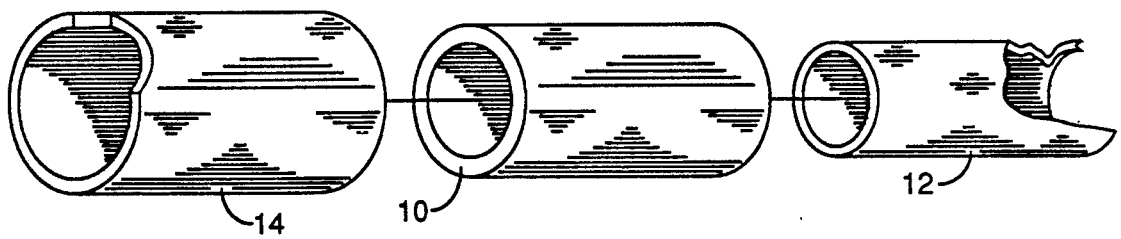
FIG. 3 shows the various components in an unassembled state.

Seventh, the now exposed coil is cut longitudinally, as shown in FIG. 2, with a conventional coil cutter in two places, 16 and 18, to produce two coil halves 10a and 10b.

Eighth, the two coil halves are split away from the inner liner and are then disposed of as solid waste.

The results of this method include the salvaging of both the outer housing and the inner liner, and the removal of the defective focusing coil as solid waste which is non-toxic, and environmentally safe for disposal. In addition to the cost savings in the salvaging of the expensive components, the housing and the liner, there is significant cost reduction in labor costs, and production costs, and an environmental hazard has been eliminated.

In accordance with the disclosed process, due to the substantial difference in the expansion rates between the housing, the liner and the epoxy enclosed impregnated coil, immersing the assembly in liquid nitrogen produces a change in temperature of more than 350 degrees F., and a resultant stress sufficient to sever or fracture the epoxy to metal bonds thereby allowing the coil to be easily driven out of the housing and then separated from the liner.

Although the invention has been described with reference to particular embodiments, it will be understood to those skilled in the art that the invention is capable of a variety of alternative embodiments within the spirit and scope of the appended claims.

What is claimed is:

1. A method for separating a focusing coil assembly comprising an epoxy impregnated coil mounted on and epoxy bonded to a cylindrical metal liner, said coil and liner being housed within and epoxy bonded to a metal housing, said method sing the steps of:
   (1) removing all hardware from said metal housing;
   (2) placing the assembly of the coil, liner and housing into a bath of liquid nitrogen;
   (3) leaving said assembly in said liquid nitrogen bath until cooled to the temperature of the liquid nitrogen, as determined by observing when the boiling in the area of the assembly has stopped;
   (4) removing the assembly from the liquid nitrogen bath;
   (5) striking the metal housing to break the epoxy and outer housing bond;
   (6) pressing the coil along with the liner out of the housing;
   (7) cutting the coil longitudinally in two places to produce two coil halves;
   (8) splitting the two coil halves away from the inner liner; and
   (9) disposing of the coil halves;
   whereby said liner and said housing are salvaged.

2. The method of claim 1 wherein said coil is pressed out of said housing with a press.

3. The method of claim 2 wherein a block shaped to fit said coil and liner is interposed between said press and said coil and liner.

4. The method of claim 1 wherein said housing is brass and said liner is lead.

5. A method for separating a focusing coil assembly comprising an epoxy impregnated coil mounted on and epoxy bonded to a cylindrical metal liner, said coil and liner being housed within and epoxy bonded to a metal housing, said method comprising the steps of:
   (1) placing the assembly of the coil, liner and housing into a bath of liquid nitrogen;
   (2) leaving said assembly in said liquid nitrogen bath until cooled to the temperature of the liquid nitrogen;
   (3) removing said assembly from the liquid nitrogen bath when said assembly cooled to the temperature of the liquid nitrogen;
   (4) striking the metal housing to break the epoxy and outer housing bond;
   (5) pressing the coil along with the liner out of the housing;
   (6) cutting the coil longitudinally in two places to produce two coil halves;
   (7) splitting the two coil halves away from the inner liner; and
   (8) disposing of the coil halves;
   whereby said liner and said housing are salvaged.

6. The method of claim 5 wherein said coil is pressed out of said housing with a press.

7. The method of claim 6 wherein a block shaped to fit said coil and liner is interposed between said press and said coil and liner.

8. The method of claim 5 wherein said housing is bass and said liner is lead.

* * * * *